United States Patent
Akashe et al.

(10) Patent No.: US 6,267,963 B1
(45) Date of Patent: Jul. 31, 2001

(54) PLANT STEROL-EMULSIFIER COMPLEXES

(75) Inventors: Ahmad Akashe, Mundelein; Miranda Miller, Arlington Heights, both of IL (US)

(73) Assignee: Kraft Foods, Inc., Northfield, IL (US)

( * ) Notice: Subject to any disclaimer, the term of this patent is extended or adjusted under 35 U.S.C. 154(b) by 0 days.

(21) Appl. No.: 09/324,702

(22) Filed: Jun. 2, 1999

(51) Int. Cl.$^7$ .................. A61K 35/78; A61K 31/56; A23L 1/28
(52) U.S. Cl. .............. 424/195.1; 424/439; 426/419; 426/615; 514/182
(58) Field of Search .................. 424/195.1, 439; 426/615, 419; 514/182

(56) References Cited

U.S. PATENT DOCUMENTS

| | | | |
|---|---|---|---|
| 3,865,939 | * | 2/1975 | Jandacek ............... 514/182 |
| 4,115,313 | | 9/1978 | Lyon et al. ............. 252/309 |
| 5,244,887 | * | 9/1993 | Straub ................... 514/182 |
| 6,063,776 | * | 5/2000 | Ostlund et al. ......... 514/182 |
| 6,068,876 | * | 5/2000 | Miller et al. ........... 426/604 |

FOREIGN PATENT DOCUMENTS

| | | |
|---|---|---|
| 0 289 636 A1 | 11/1988 | (EP) . |
| 0 839 458 A1 | 5/1998 | (EP) . |
| 0 897 671 A1 | 2/1999 | (EP) . |
| 1298047 | * of 1992 | (GB) . |
| WO/97/42830 | 11/1997 | (WO) . |

OTHER PUBLICATIONS

Abstract: JP 4149194 A, "New Lecithin sterol Complexes—Used as Emulsifier for Cosmetics, Drugs and Foods", May 22, 1992.

Abstract, JP 6329588 A. "Water–dispersible monoglyceride (s) useful as food emulsifiers—is prepared by melt–mixing monoglyceride containing saturated fatty acid gp. And phytosterol the pulverizing", Nov. 29, 1994.

"Reduction of Serum Cholesterol with Sitostanol–ester Margarine in a Mildly Hyperchloesterolemic Population", *New England Journal of Medicine*, Nov. 16, 1995, pp. 1308–1312.

* cited by examiner

*Primary Examiner*—Christopher R. Tate
(74) *Attorney, Agent, or Firm*—Fitch, Even, Tabin & Flannery

(57) ABSTRACT

Plant sterols have been shown to be cholesterol-reducing agents in human serum. In the present invention, plant sterols, plant stanols, plant sterol esters and other non-toxic sterols are co-crystallized with emulsifiers to form a plant sterol/emulsifier complex or plant stanol/emulsifier complex which can be incorporated into full-fat, reduced-fat, low-fat, fat-free and triglyceride-free food products. Plant sterols and plant stanols can be co-crystallized with emulsifiers to produce a blend which has a melting temperature significantly lower than the melting temperature of the plant sterol or plant stanol. Such complexes can be used to incorporate relatively high levels of such sterols/stanols in food products without the adverse organoleptic effect normally associated with the use of such plant sterols and plant stanols.

20 Claims, No Drawings

PLANT STEROL-EMULSIFIER COMPLEXES

FIELD OF THE INVENTION

The present invention relates to plant sterol and plant stanol complexes or blends with reduced melting points which are generated without resorting to chemical modification of the plant sterols or plant stanols. Such plant sterol and plant stanol complexes or blends are generated by co-crystallization of the plant sterols or plant stanols with one or more emulsifiers. Such plant sterol and plant stanol complexes may be used as cholesterol-reducing agents in oil-in-water emulsions, water-in-oil emulsions, or mesophases to generate full fat, low-fat, fat-free, and triglyceride-free food products which deliver relatively high levels of cholesterol-reducing agents.

BACKGROUND OF THE INVENTION

Cholesterol has been known for many years to be a component of atherosclerotic plaques. Mounting evidence indicates diets high in cholesterol may increase the levels of cholesterol in the blood which, in turn, increase the risk of atherosclerotic disease and its attendant manifestations of heart attack, stroke and other tissue injuries resulting from atherosclerosis. Cholesterol absorbed from dietary sources is thought to increase the risk of atherosclerotic disease.

Other than avoidance or reduced consumption of high cholesterol foods, measures available without prescription to the general public to reduce the absorption of cholesterol from the diet have met with little success. Furthermore, in many cases, high serum cholesterol cannot be reduced by lowering dietary cholesterol. However, high cholesterol levels in serum can be lowered effectively by altering the intestinal metabolism of lipids. In recent years, it has become known that certain plant sterols and plant stanols such as β-sitosterol (24-ethyl-5-cholestene-3β-ol) and its hydrogenated form (β-sitostanol (24-ethyl-5α-cholestane-3β-ol) can help lower serum cholesterol by inhibiting cholesterol absorption in the digestive system. Plant stanols are the hydrogenated form of plant sterols. See, e.g., "Reduction of Serum Cholesterol With Sito Stanol-Ester Margarine in a Mildly Hypercholesterolemic Population", *New England Journal of Medicine*, Nov. 16, 1995, pp. 1308–1312.

The use of plant sterols, which are natural components of vegetable fats and oils, in food products is considered safe. Plant sterols themselves are not absorbed—or only absorbed in very small amounts—from the intestines. A decreased incidence of coronary disease is clearly associated with a decrease in serum cholesterol and, in particular, a decrease in LDL cholesterol. A high serum cholesterol level is one of the most significant indicators of risk of coronary disease. There are a variety of naturally occurring plant sterols which have been reported to have a cholesterol-reducing effect, although not all have equivalent action.

Although the mechanism by which plant sterols achieve the effect of lowering serum cholesterol has not been fully elucidated and not wishing to be limited by theory, it is believed that plant sterols interfere with cholesterol absorption by competition-type mechanisms. Cholesterol absorption appears to take place primarily in the proximal third of the small intestine. Cholesterol esters must be converted to their free hydroxyl form by the action of cholesterol esterases before they can be absorbed. The free cholesterol requires bile salts for solubilization and absorption. Bile salts form an aqueous dispersion of micelles in which the cholesterol is solubilized along with phospholipids and hydrolysis products of other dietary lipids. Micelles transport the cholesterol across the hydrophilic barrier (the unstirred water layer) to reach the surface of the intestinal mucosa. At the mucosa, it is thought that the cholesterol dissociates from the micelle and is transported into the mucosal cells by a process which has not yet been fully defined but may include passive exchange diffusion or by protein-mediated transport. Plant sterols could interfere with cholesterol absorption at either of, or at both of, the following: (a) competition with cholesterol for absorption into the bile-salt micelles or (b) competition with the transport mechanism into the mucosal cells. Whether plant sterols displace cholesterol from the micelles by mass action, or whether they compete with cholesterol for binding at the mucosal transport system, a soluble form of the plant sterol should be more effective than crystalline forms. In fact, it has been suggested that "the cholesterol-lowering effect of sitostanol may be increased when it is ingested in a soluble form." *New England Journal of Medicine*, Nov. 16, 1995, p.1308.

Conventionally, plant sterols have been incorporated into food products by melting a sterol or stanol, incorporating it into an oil phase, and blending the oil phase with other components to result in a plant sterol-containing food product. However, the plant sterols generally have high melting points (i.e., about 130–180° C.) which can result in the crystallization of the plant sterols within the oil phase of such food products. Such crystallization results in food products with a gritty and unacceptable texture. This gritty texture is especially detectable when the oil/plant sterol phase is incorporated at high levels in the food product. Furthermore, the high melting points of such plant sterols makes it difficult to blend such plant sterols with an aqueous phase. Attempts have been made to solve this problem using chemical modification of the plant sterols. For example, esterification of plant sterols generally results in lowered melting temperatures. Thus, such plant sterol esters generally may be incorporated into food products more readily due to the lower melting points and can provide food products without significant gritty texture.

It would be desirable, therefore, to provide forms of plant sterols which can be incorporated into food products at relatively high levels without adversely affecting texture or other organoleptic properties. It would also be desirable to provide forms of plant sterols which can more easily be incorporated into food products. It would also be desirable to provide methods for preparing such plant sterols without chemical modification of the plant sterol itself. The present invention provides such plant sterols and methods for preparing them.

SUMMARY OF THE INVENTION

The present invention relates to full-fat, low-fat, fat-free and triglyceride-free food products which incorporate plant sterols as cholesterol-reducing compounds. The cholesterol-reducing compounds are incorporated into food products by adding them as plant sterol-emulsifier complexes in which a plant sterol is mixed with an emulsifier, and the mixture is co-crystallized to form the plant sterol-emulsifier complex. The plant sterol-emulsifier complexes can be incorporated into full-fat, low-fat, fat-free and triglyceride-free food products. Methods for making such plant sterol-emulsifier complexes and food products which incorporate such plant sterol-emulsifier complexes are provided.

The sterol and emulsifiers complexes of this invention can be prepared using sterols, esterified sterols, and mixtures thereof. The invention, however, appears to be used to its greatest advantage when employing non-esterified sterols. The plant sterol esters have relatively lower melting points than the plant sterols themselves and can more readily be dissolved in oil phases. They do not have to as great an extent the problem of solubilization and dispersion in food products comprising water-in-oil or oil-in-water emulsions. However, more of the esterified plant sterols by weight are required in comparison with as the plant sterols themselves to lower serum cholesterol because the ester portion of the molecule does not appear to be effective in the lowering of serum cholesterol. Thus, the present invention is important as it allows the use of unmodified plant sterols in food products in a form (i.e., non-crystalline) that competes more effectively with cholesterol for absorption by the intestinal mucosa. The present invention can be used, however, to incorporate higher levels of esterified plant sterols than has been possible in the past.

The plant sterol-emulsifier complexes of the present invention are prepared by mixing plant sterol and emulsifier in the ratio of about two parts plant sterol to about one part emulsifier to a ratio of about one part plant sterol to about two parts emulsifier, adding about 0 to about 80 percent of a triglyceride oil, heating the mixture until it melts, and co-crystallizing the melted mixture to form the plant sterol-emulsifier complex, wherein the plant sterol-emulsifier complex has a melting temperature at least 30° C. below that of the plant sterol. Preferably, the plant sterol-emulsifier complex has a melting temperature at least 50° C. below that of the plant sterol. Plant sterol-emulsifier complexes can be prepared with plant sterols as well as esterified plant sterols. Preferably the plant sterol-emulsifier complexes are prepared with the non-esterified plant sterols.

For purposes of this invention, "plant sterols" is intended to include both plant sterols and plant stanols; the term "sterols" alone is intended to include only the plant sterols; and the term "stanols" alone is intended to include only the plant stanols. The inherently non-absorbable sterols are not necessarily limited to the conventional plant sterols (i.e., sterols and stanols) but encompass all nontoxic sterols and like compounds which compete with cholesterol for occupancy in the oil droplets of the bile-salt micelles, according to current theory, thereby promoting crystallization of cholesterol in the intestine so that it may be excreted without absorption. Furthermore, for purposes of this invention, the term "plant sterols" is intended to include both the non-esterified and the esterified form of any of the plant sterols mentioned hereinabove.

The co-crystallization of the non-esterified plant sterols with one or more emulsifiers reduces the melting temperature of the plant sterol-emulsifier complex to about 70 to about 100° C., and preferably to about 70 to about 75° C. The co-crystallization of the non-esterified plant sterols with one or more emulsifiers in the presence of triglyceride oil reduces the melting temperature of the plant sterol-emulsifier complex to about 30° C. to about 100° C. For purposes of this invention, the "melting temperature" of a plant sterol or a plant sterol-emulsifier complex is defined by differential scanning calorimetry. The melting temperature is measured while raising the temperature of the already formed plant sterol-emulsifier complex. A related temperature is termed the "onset of crystallization temperature" which is the temperature at which, for the melted plant sterol-emulsifier complex, the transition from a clear, liquid form to a turbid, crystalline form occurs. The onset of crystallization is validated by differential scanning calorimetry. The onset of crystallization temperature is measured as the temperature is decreased. Generally, the melting temperature and the onset of crystallization temperature will be within a few degrees of each other.

Due to their reduced melting temperatures, the plant sterols co-crystallized as described in this disclosure (i.e., the plant sterol-emulsifier complexes) are less likely to crystallize during or after the manufacture of food products and are, therefore, a more preferred form of the cholesterol-reducing agents. The present invention provides such co-crystallized forms of the plant sterols which will be referred to for purposes of this disclosure as a "plant sterol-emulsifier complex".

The plant sterol-emulsifier complexes may be added to food products in an oil-in-water emulsion, a water-in-oil emulsion, a mesophase, or in any other form of addition suitable for preparing foods for human consumption. The present invention provides plant sterol-emulsifier complex compositions wherein the plant sterol is present in an amount sufficient to reduce serum cholesterol levels in a human consuming such food products. In addition, the present invention provides methods for generating plant sterol-emulsifier complexes for use in food products. Moreover, the present invention provides food products generated by incorporating the plant sterol-emulsifier complex into a food product.

It is, therefore, an object of the present disclosure to provide a plant sterol-emulsifier complex suitable for incorporation into food products, wherein the complex is co-crystallized to form the plant sterol-emulsifier complex having a melting temperature at least 30° C. lower than the plant sterol alone, and wherein the plant sterol-emulsifier complex can be incorporated into food products in an amount effective to reduce serum cholesterol levels in a human consuming such food products, without adversely modifying the texture of the food product.

It is a further object of the present disclosure to provide a method of forming a plant sterol-emulsifier complex for use in a food product, said method comprising (1) forming a mixture of a plant sterol and emulsifier in the ratio of about two parts plant sterol to about one part emulsifier to a ratio of about one part plant sterol to about two parts emulsifier, (2) heating the mixture to a temperature sufficient to melt the plant sterol, and (3) cooling the heated mixture with agitation to form a co-crystallized plant sterol-emulsifier complex, wherein the plant sterol-emulsifier complex can be incorporated into the food product in an amount effective to reduce serum cholesterol levels in a human consuming the food product and without producing gritty texture in the food product.

It is yet a further object of the present disclosure to provide food product containing a cholesterol-reducing amount of a plant sterol, wherein the plant sterol is incorporated as a sterol-emulsifier complex which does not adversely affect the texture of the food product. It is also an object of the present invention to provide a food product containing a cholesterol-reducing amount of a plant sterol where in the plant sterol is incorporated as a sterol-emulsifier complex and the plant sterol is in a form that is readily available in the intestines to exchange with micellar cholesterol. Largely due to the high melting point of plant sterols, in most conventional methods for incorporation of plant sterols into food products, much of the plant sterols are in the crystalline form. Even when dissolved in an oil phase, they tend to form crystals. Therefore, only a small portion of the plant sterols are available in the intestines to compete with cholesterol for the mixed bile-salt micelles. The non-soluble fraction of the plant sterol would tend to pass through the gut intact, and thus, unabsorbed. In contrast, plant sterols incorporated into the plant sterol-emulsifier complex of this invention appear to remain, to a large extent, solubilized. In this form, they can readily be exchanged with micellar cholesterol and can effectively compete for cholesterol either at the micelle or at the mucosal surface. In addition, when mixed with a mesophase, plant sterols that are not incorporated into the mesophase itself may become incorporated in the emulsion portion of a mesophase-stabilized emulsion, which may also contribute to the absorption of plant sterols by the intestinal mucosa.

Still another object of the present invention is to provide a plant sterol-emulsifier complex suitable for incorporation into a food product, said plant sterol-emulsifier complex comprising a mixture of plant sterol and emulsifier in the ratio of about two parts plant sterol to one part emulsifier to a ratio of about one part plant sterol to about two parts emulsifier, adding about 0 to about 80 percent of a triglyceride oil, wherein the mixture is co-crystallized to form the plant sterol-emulsifier complex having a melting temperature at least 30° C. lower than the plant sterol alone and wherein the plant sterol-emulsifier complex can be incorporated into the food product in an amount effective to reduce serum cholesterol levels in a human consuming the food product without adversely modifying the texture of the food products.

Another object of the present invention is to provide a method of forming a plant sterol-emulsifier complex suitable for use in a food product, said method comprising: (1) forming a mixture of plant sterol and emulsifier in the ratio of about two parts plant sterol to one part emulsifier to a ratio of about one part plant sterol to about two parts emulsifier, and 0 to about 80 percent triglyceride oil; (2) heating the mixture to form a melted mixture; and (3) cooling the melted mixture with stirring to co-crystallize the plant sterol and the emulsifier to form the plant sterol-emulsifier complex, wherein the plant sterol-emulsifier complex has a melting temperature at least 30° C. lower than the plant sterol alone and wherein the plant sterol-emulsifier complex can be incorporated into the food product in an amount effective to reduce serum cholesterol levels in a human consuming the food product without adversely modifying the texture of the food product.

Still yet another object of the present invention is to provide a food product containing a cholesterol-reducing amount of a plant sterol wherein the plant sterol is incorporated into the food product using an emulsion or a mesophase containing a plant sterol-emulsifier complex having a melting temperature at least 30° C. lower than the plant sterol alone and wherein the plant sterol-emulsifier complex does not adversely affect the texture of the food product.

These and other objects and advantages of the present invention will be apparent to those skilled in the art upon a consideration of the present specification.

DETAILED DESCRIPTION OF THE INVENTION

The present invention provides full-fat, low-fat, fat-free, and triglyceride-free food products which incorporate plant sterols as cholesterol-reducing compounds. The cholesterol-reducing compounds are incorporated into food products by adding them as plant sterol-emulsifier complexes. To form the desired sterol-emulsifier complex, the plant sterol is mixed with an emulsifier (and optionally with a triglyceride oil) and the resulting mixture is heated above its melting temperature and then cooled. Upon cooling, the plant sterol and emulsifier co-crystallized to form the plant sterol-emulsifier complex. The plant sterol-emulsifier complex can be prepared with or without added triglyceride oil. The plant sterol-emulsifier complexes can be incorporated into full-fat, low-fat, fat-free and triglyceride-free food products in a cholesterol-reducing amount without imparting gritty texture or other undesirable organoleptic properties to the resulting food products. Such food products include, but are not limited to, pourable dressings, spoonable dressings, whipped desserts, whipped toppings, frozen dairy foods, dips, sauces, soups, yogurts, dessert toppings, spreads, sour cream products, cream cheese, products, and the like. An important feature of the plant sterol-emulsifier complexes of the present invention is that the complexes have melting temperatures that are reduced by at least 30° C., and preferably by at least 50° C. relative to the melting temperature of the plant sterol used to produce the complex. This reduced melting temperature allows the incorporation of the plant sterol in food products at a relatively high level without producing a gritty texture.

This invention uses plant sterol-emulsifier complexes to incorporate plant sterols into a variety of food products. The plant sterol-emulsifier complex may be incorporated into food product by, for example, blending with an aqueous solution with agitation to provide either oil-in-water emulsions or water-in-oil emulsions that effectively incorporate the cholesterol-reducing compounds. Alternatively, the plant sterol-emulsifier complex may be incorporated into food products using a mesophase gel, or mesophase-stabilized composition, wherein the cholesterol-reducing-compounds are effectively dispersed as individual molecules in the mesophase structure. The use of mesophases will further reduce the tendency for the plant sterol to crystallize. The use of mesophases in low-fat, fat-free, and triglyceride-free food products is described in previously filed U.S. patent application Ser. Nos. 09/258,759 and 09/258,987, both of which were filed on Feb. 26, 1999, and both of which are incorporated in their entirety herein by reference. As disclosed in these applications, the mesophases may be formulated using either two or three emulsifiers. Any excess plant sterol-emulsifier complex (i.e., any that is not dispersed into the mesophase) can be readily dispersed as an emulsion in the mesophase by using high shear (e.g., about 5000 sec$^{-1}$ to about 50,000 sec$^{-1}$). Furthermore, the plant sterol-emulsifier complexes may be incorporated into full-fat, low-fat, fat-free, or triglyceride-free food products in any other fashion. The use of the present plant sterol-emulsifier complexes allows the preparation of food products containing plant sterols in an amount effective to reduce serum cholesterol levels in a human consuming such food products without adversely modifying the texture of the food products.

This invention also allows larger amounts of plant sterols to be incorporated in low-fat or fat-free food products without adversely affecting the organoleptic properties of these food products. In fact, the use of a mesophase to incorporate plant sterols can actually improve the organoleptic properties of the resulting food products and can result in new product concepts. Creamy mesophase-stabilized food product emulsions may be made with as much as 12 percent plant sterol using the plant sterol-emulsifier complexes of this invention. The plant sterol-emulsifier complexes of this invention can be prepared with or without added triglyceride. Since the plant sterols can be incorporated without the need for an oil carrier, lower fat products can easily be created. In addition and not wishing to be limited by theory, we hypothesize that the biological attributes of the plant sterols can be enhanced using plant sterol-emulsifier complexes of this invention in mesophases. Since the plant sterols appear to be contained as molecular inclusions in the mesophase structure, they are delivered to the intestine in a form similar to that when cholesterol is emulsified in bile-salt micelles and delivered to the intestines. Thus, the inherently non-absorbable plant sterols may to be delivered in a more absorbable form to the intestinal mucosa and, thus, can more readily compete with cholesterol for absorption. This enhanced delivery system should allow the currently recommended dosage of plant sterols (i.e., about 3 g/day) to be achieved in an easier and more acceptable form for the consumer.

The plant sterol-emulsifier complexes of this invention can be used in full-fat, reduced fat, low-fat, fat-free, or triglyceride free food products. For purposes of this invention, the term "full-fat" is generally used as it is currently defined by the FDA Standards of Identity. In addition, the term "low-fat" includes "reduced-fat," "light," "low-fat," and "fat-free" as defined by the Standards of Identity. In addition, for purposes of this invention, "low-fat" also encompasses triglyceride-free products although they are not included in the Standards of Identity. However, the term "fat-free" is intended to include only "fat-free" as defined by the Standards of Identity. In addition, the terms "full-fat", "low-fat" and "fat-free" are intended to include full-fat, low-fat, and fat-free food products that do not fall into the categories defined by the Standards of Identity (as of the time of this disclosure) but deliver to the consumer either full-fat or reduced levels of fat per serving. Furthermore, a composition containing high levels of plant sterols with no added oil added via the plant sterol-emulsifier complex may be described as "triglyceride-free" for purposes of this invention even though they may not be termed "fat-free" under the current Standards of Identity.

In one embodiment of the invention, a plant sterol-emulsifier complex suitable for incorporation into food products is provided, wherein a mixture of a plant sterol and an emulsifier is co-crystallized to form the plant sterol-emulsifier complex. Such a plant-sterol emulsifier complex comprises a mixture of plant sterol and emulsifier in the ratio of about two parts plant sterol to one part emulsifier to a ratio of about one part plant sterol to about two parts emulsifier. Preferably, the ratio of plant sterol and emulsifier about one to one. The plant sterol and the emulsifier are mixed together to form a mixture, the mixture is melted, and the melted mixture is cooled with mixing to co-crystallize the plant sterol and the emulsifier, forming the plant sterol-emulsifier complex. The plant sterol-emulsifier complex has a melting temperature of at least 30° C. lower than the plant sterol alone, and preferably at least 50° C. lower. The plant sterol-emulsifier complex can be incorporated into food products in an amount effective to reduce serum cholesterol levels in a human consuming such food products without adversely modifying the texture of the food products.

In another important embodiment of the invention, a plant sterol-emulsifier complex comprises a mixture of plant sterol and emulsifier in the ratio of about two parts plant sterol to one part emulsifier to a ratio of about one part plant sterol to about two parts emulsifier and about 0 to about 80 percent of a triglyceride oil. The plant sterol, the emulsifier, and the triglyceride oil are mixed together to form a mixture, the mixture is melted and the melted mixture is cooled with stirring to co-crystallize the plant sterol and the emulsifier, forming the plant sterol-emulsifier complex.

Suitable emulsifiers include propylene glycol monoester, lactylated monoglycerides, sodium stearoyl lactylate, diacetyl tartaric acid monoesters, acetic acid ester of monoglyceride, monoglyceride and mixtures thereof.

When preparing the plant sterol-emulsifier complex utilizing a triglyceride oil, edible oils such as, for example, vegetable oil, olive oil, corn oil, soybean oil, canola oil, sunflower seed oil, peanut oil, sucrose fatty acid polyesters, and the like, as well as mixtures thereof, can be used. Other well known edible oils may also be used. A single edible oil or mixtures of such edible oils may be used.

As described hereinabove, a wide variety of food products may be generated utilizing the present invention. The food products may range in fat content from full-fat to fat-free or triglyceride-free food products. In recent years, many efforts have been made to reduce the fat content of various foods, such as salad dressing, sour cream and frozen desserts. When the fat level is reduced in conventional food products, however, the organoleptic properties are generally adversely affected because of the oiliness (lubricity) and slipperiness imparted by the fat particles suspended in the food product are effectively lost. As disclosed in U.S patent application Ser. Nos. 09/258,759 and 09/258,987, the use of mesophases in low-fat and fat-free food products achieve desirable textural, flavor-yielding and stability-yielding attributes in the food products in which they are incorporated.

Using the present invention, if desired, large amounts of plant sterols (i.e., up to about 12 percent of the total food product can be incorporated without adversely affecting the texture or other organoleptic properties of the food product. Thus, the plant sterol can be incorporated into food products and, thus, into normal diets, at cholesterol-reducing levels. The plant sterol-emulsifier and plant sterol-emulsifier-oil complexes of the present invention can be incorporated into food products in a number of ways. For example, such complexes can simply be added to the food product. Preferably, however, the complexes are incorporated using oil-in-water or water-in-oil emulsions or mesophases.

The plant sterol-emulsifier complex and an aqueous phase with emulsifier(s) dispersed therein, can be blended to form a mixture which, when subjected to shear under the conditions describe herein, results in a plant sterol-containing emulsion. Alternatively, a dispersion of plant sterols within a mesophase can be prepared by the inclusion of a plant sterol-emulsifier complex in the mesophase gel. Such a mesophase gel-stabilized dispersion can be prepared containing relatively low levels of cholesterol-reducing-compounds (generally at about 1 to about 6 percent based on the total weight of the composition), an aqueous phase, two or more emulsifiers, edible acids, flavorings, egg products, or ingredients and the like. When subjected to shear under the conditions desired herein, such a mixture will form a plant sterol-containing dispersions stabilized by the mesophase. Such plant sterol-containing mesophase-stabilized dispersions may be utilized to produce fat-free and triglyceride-free food products.

If the plant sterol-emulsifier complex is added to a mesophase gel, for instance, a low level of plant sterol-emulsifier complex (i.e., about 1 to 6 percent plant sterols, made in the absence of oil) may allow the resulting food product to be termed triglyceride-free as effectively no oil is added to the resulting food product. In other cases, however, the amount of plant sterols incorporated in the form of a plant-sterol emulsifier complex may be present at higher levels in the mesophase gel. In such cases, the excess plant sterol may be incorporated into the mesophase-stabilized emulsion during the application of shear. Shear in these processes should normally be in the range of about 5000 sec$^{-1}$ to about 50,000 sec$^{-1}$. Alternatively, such excess plant sterol can be incorporated into the mesophase-stabilized emulsion by adding oil to the plant sterol and emulsifier in the formation of the plant sterol-emulsifier complex. Of course, such added oil will increase the oil content of the resulting product.

The plant sterol-emulsifier complexes of the present invention have significantly lower melting temperatures relative to the starting plant sterol. Generally, the plant sterol-emulsifier complexes of this invention have melting temperatures of at least 30° C., and preferably, at least 50° C., lower than the corresponding plant sterol. This lower melting point allows incorporation of the plant sterol into food products, while avoiding the grittiness that arises in the use of conventional plant sterol compounds. Thus, the present invention allows the use of plant sterols in formulating food products and in amounts which are effective in reducing the serum cholesterol of humans who consume such food products. The present invention allows the incorporation of cholesterol-reducing amount of plant sterols in a form (i.e., the plant sterol-emulsifier complex) without the gritty textural qualities normally associated with plant sterols. Thus, the use of plant sterols in the plant sterol-emulsifier complexes achieves superior health-promoting characteristics, higher levels of plant sterol incorporation, and desirable textural attributes.

Not only are the textural characteristics of the resulting food products improved by use of the plant sterol-emulsifier complexes of the present invention, the stability of the resulting plant sterol-containing compositions is also improved with the use of the plant sterol-emulsifier complexes of the present invention. Often, plant sterols added alone to an emulsion composition will destabilize the emulsion, as evidenced by the release of free oil. In contrast, the addition of the plant sterol-emulsifier complexes of this invention result in ready incorporation of the plant sterol into the emulsion, as evidenced by the lack of free oil released upon homogenization.

The advantage of the present invention is evident in the comparison of the melting temperature of the plant sterols and the melting temperatures of the plant sterol-emulsifier complexes of this invention. Differential scanning calorimetry can be used to determine the melting temperature of such complexes; for purposes of this invention, the differential scanning calorimetry melting temperature is the peak of the endotherm on the temperature vs. heat plot. Similar techniques (i.e., differential scanning calorimetry) can also be used to determine the reverse transition (i.e., from the melted, liquid form to a turbid, crystalline form by the detection of the emergence of turbidity of the sample). This reverse transition temperature is, for purposes of this invention, the temperature at the onset of co-crystallization. A typical plant sterol will melt and crystallize at between about 130° C. and 150° C. In contrast, a typical co-crystallized plant sterol-emulsifier complex as disclosed herein, melts and recrystallizes at between about 70° C. and about less than 100° C. In most cases, the melting temperature and the onset of co-crystallization will be within a few degrees of each other.

The plant sterol-emulsifier complexes of this invention generally contain plant sterol and emulsifier in the ratio of about two parts plant sterol to one part emulsifier to a ratio of about one part plant sterol to about two parts emulsifier, and 0 to about 80 of a triglyceride oil. In other words, the plant sterol-emulsifier complexes of this invention may be prepared with or without triglyceride oils. For plant sterol-emulsifier complexes without triglyceride oil, the complex generally contains about 67 to about 33 percent plant sterol, and about 33 to about 67 percent emulsifier. Preferably, the complex contains about 60 to about 40 percent plant sterol, and of about 40 to about 60 percent emulsifier. When formulating the plant sterol-emulsifier complex in the presence of triglyceride oil, the complex generally contains plant sterol and emulsifier in the ratio of about two parts plant sterol and one part emulsifier to a ratio of about one part plant sterol to about two parts emulsifier, and about 0 to about 80 percent oil.

The examples that follow are intended to further describe and not to limit the invention. The plant sterol-emulsifier complexes and methods to formulate them may be used to generate a variety of full-fat, low-fat, fat-free and triglyceride-free products (e.g., pourable dressings, spoonable dressings, whipped desserts, whipped toppings, frozen dairy foods, dips, sauces, soups, yogurts, dessert toppings, spreads, sour cream products, cream cheese, products, and the like.) All percentages and ratios used herein are by weight, unless otherwise indicated. All references cited in the present specification are incorporated by reference.

EXAMPLE 1.

Various emulsifiers were co-crystallized with plant sterols in the ratios as indicated. The plant sterols used was from Cargill, Incorporated (Minneapolis, Minnesota) and had a melting temperature of about 120–130° C. The plant sterol and the emulsifier were co-melted at a temperature of about 140–150° C., and then cooled under ambient conditions with continuous mixing until visual turbidity of the melt was detected. The onset of co-crystallization temperature was determined using a variety of plant sterol-emulsifier complexes:

| BLEND | RATIO | ONSET OF CO-CRYSTALLIZATION (° C.) |
|---|---|---|
| Plant sterols/propylene glycol of monoester (Promodan USVK ™) | (1:1) | 70 |
| Plant sterols/propylene glycol of monoester/soybean oil | (1:1:1) | 67 |
| Plant sterols/Lactic acid ester of monoglyceride (Lactodan ™) | (1:1) | 89–70 |
| Plant sterols/Lactic acid ester of monoglyceride/soybean oil | (1:1:1) | 78–80 |
| Plant sterols/sodium steroyl lactylate | (1:1) | 85–90 |
| Plant sterols/polysorbate 65 | (1:1) | 110–120 |

As compared to the plant sterol alone, it can readily be seen that all emulsifiers (except polysorbate) allowed the preparation of plant sterol-emulsified complexes having melting properties significantly lower.

EXAMPLE 2.

Plant sterol-emulsifier complexes were prepared using the same plant sterol as used in Example 1. Both the melting temperature and onset of co-crystallization temperature were determined using differential scanning calorimetry (DSC). The plant sterol-emulsifier complexes were prepared essentially as in Example 1 except that the ingredients were co-melting in a glass test tube using a heating block adjusted to 140° C. and, once the mixture was completely melted, it was cooled with constant agitation by placing it a water bath at 20° C. DSC analysis was carried out by sealing samples in aluminum sample pans (Kit No. 0219-0062; Perkin- Elmer, Norwalk, Conn.) and heated or, alternatively, cooled using a Perkin-Elmer DSC-7 (Perkin-Elmer, Norwalk, Conn.). To determine the melting temperature, each plant sterol-emulsifier complex was heated from 0 to 160° C. at a rate of 10 degrees/min. To determine the onset of crystallization temperature, each plant sterol-emulsifier complex was heated to 160° C. then cooled to 0° C. at rate of 200 degrees/min.

The following results were obtained.

| Sample | Temperature (° C.) | Onset of Co-Crystallization Temperature (° C.) |
| --- | --- | --- |
| Plant sterols (control) | 128 | 148.3 |
| Plant sterols/Sodium Stearoyl Lactylate (1:1) | 96.6 | 94.9 |
| Plant sterols/Sodium Stearoyl Lactylate/Soybean Oil (1:1:1) | 71.1 | 68.6 |
| Plant sterols/Propylene Glycol Monoester (1:1) | 85.2 | 81.8 |
| Plant sterols/Propylene Glycol Monoester/Soybean Oil (1:1:1) | 72.9 | 69.6 |
| Plant sterols/Lactic Acid Ester of Monoglyceride (1:1) | 86.7 | 91.9 |
| Plant sterols/Lactic Acid Ester of Monoglyceride/Soybean Oil (1:1:1) | 75.5 | 77.9 |
| Plant sterols/Liquid Diacetyl Tartaric Acid of Monoester (1:1) | 76.7 | 69.3 |
| Plant sterols/Liquid Diacetyl Tartaric Acid of Monoester/Soybean Oil (1:1:1) | 75 | 60.2 |
| Plant sterols/Polysorbate 80 (1:1) | 111 | 113.3 |

Again, except for the blend prepared with polysorbate 80 emulsifier, all plant sterol-emulsifiers complexes had significantly lower onset of co-crystallization temperatures than the plant sterol alone.

EXAMPLE 3.

In this example, plant sterol-emulsifier complexes were used to prepare an oil-in-water emulsion and evaluated for stability and textural characteristics. Sodium stearoyl lactylate and plant sterols (the same sterols as used in Example 1) were dry blended and then dispersed in soybean oil. The sodium stearoyl lactylate, plant sterols, and soybean oil were in a ratio of 1:1:1. The mixture was then heated in a conventional microwave oven until it was completely melted (about 130–140° C.). The melted material was cooled to 90° C. with stirring. The resulting plant sterol-emulsifier melt was added slowly to water at about 90° C. in a conventional jacketed beaker with stirring. The mixture was held at 90° C. for about 3–5 minutes and then passed through a high shear homogenizer at a rate of 25,000 sec$^{-1}$. The resulting emulsion was very stable with no gritty texture detectable. The final emulsion contained 6 percent sodium stearoyl lactylate, 6 percent plant sterols, 6 percent soybean oil, and 82 percent water.

EXAMPLE 4.

A triglyceride-free emulsion was prepared with plant sterols (same as used in Example 1) and evaluated for stability and textural characteristics. Sodium stearoyl lactylate and plant sterols (1:1) were dry blended and melted in a conventional microwave oven at 130–140° C. After the sodium stearoyl lactylate and plant sterols were completely melted, the melted material was cooled to 90° C. with stirring. Then the mixture was slowly added to pre-heated water at 90° C. The mixture was mixed at 90° C. for 3–5 minutes, cooled, then homogenized through a medium shear homogenizer. The resulting emulsion (88 percent water, 6 percent plant sterol, and 6 percent sodium stearoyl lactylate) was very stable with a very smooth texture.

EXAMPLE 5.

This example illustrates the preparation of a ranch dressing using the plant sterol-emulsifier complexes of this invention. A control sample was also prepared in which the plant sterol was added alone. A plant sterol-emulsifier complex and an emulsion containing the plant sterol-emulsifier complex was prepared as described in Example 3. After the emulsion was cooled to room temperature, it was blended with a ranch dressing wet spice mix in a Hobart™ mixer. The ratio of the emulsion to wet spice blend was 1:2. The plant sterol emulsion/spice mix was then homogenized. For the control dressing, the emulsion was prepared in essentially the same manner except that the plant sterol powder (crystalline) was added to pre-formed emulsion of oil-in-water emulsion prepared at 90° C.

The dressing prepared with the plant sterol-emulsifier complex had excellent textural and flavor properties and was similar to conventional ranch dressings (i.e., one prepared without any plant sterol). The plant sterol control (i.e., direct addition of plant sterols alone) resulted in an unacceptable dressing product (very gritty, unpleasant texture). This example was repeated using plant sterol-emulsifier complexes prepared with plant sterol and sodium stearoyl lactylate (1:1) and plant sterol and a mixture of sodium stearoyl lactylate and propylene glycol monoester. These plant sterol-emulsifier complexes yielded ranch dressings with excellent textural and flavor properties similar to conventional ranch dressings. The final compositions of the inventive sample (i.e., plant sterol added in form of complex) and control (i.e., plant sterol added alone) were as follows:

| INGREDIENT | AMOUNT (g) |
| --- | --- |
| Sterols, Emulsifiers and Oil | |
| Diacetyl Tartaric Acid of Monoester | 37.4 |
| Sodium Stearoyl Lactylate | 37.42 |
| Plant Sterols | 74.8 |
| Water | 530 |
| Canola Oil | 68 |
| Wet spice blend | |
| butter milk | 1019 |
| Salt | 115 |
| Sugar | 207 |
| Corn syrup | 1359 |
| Dairy flavors and spices | 240 |
| Xanthan | 29.9 |
| Starch | 81.7 |
| Water | 1241 |
| Vinegar | 238.5 |

EXAMPLE 6.

This example illustrates the incorporation of plant sterols into processed cheese using the plant sterol-emulsifier complexes of this invention. Two controls were also used. The first control (i.e., conventional processed cheese) was prepared without any plant sterols. The second control (i.e., direct addition of crystalline plant sterol) was prepared in essentially the same manner as the inventive sample except for the form of the added plant sterol. Except as just noted and further noted in the footnotes, the final compositions of each of the controls and the inventive sample were as follows:

| Ingredient | Amount (g) |
|---|---|
| Natural Cheese | 589 |
| Emulsifying salts | 23.8 |
| NFDM | 7.2 |
| Color | 0.28 |
| Butter Fat | 0* |
| Wet mix | 194 |
| Plant sterols | 53.3** |
| Propylene Glycol Monoester | 26.6*** |
| Sodium Stearoyl Lactylate | 26.6*** |

*The conventional cheese control sample contained 10 g butter fat; the direct addition sterol sample and the inventive sample did not contain any added butter fat.
**The conventional cheese control sample did not contain plant sterols.
***Neither the conventional cheese control sample nor the direct addition plant sterol sample contained propylene glycol monoester or Sodium Stearoyl lactylate The cheese was processed in a laboratory lay down cooker. The cooker jacket was connected to a water bath for heating. In the cooker, the natural cheese was blended in and heated to about 57° C. At this point, the cheese was soft and partially melted. Emulsifying salts were added, followed by the rest of the ingredients. The blend was then heated to about 74° C. and held at that temperature for about 1 minute. The melted cheese was then poured into cheese single slice molds and allowed to cool at ambient temperature. The resulting cheese was refrigerated overnight. The resulting cheese containing plant sterols added as plant sterols/emulsifier complexes did not have a gritty texture; its texture resembled a regular full fat processed cheese. The control prepared by adding plant sterols directly had a gritty and unacceptable texture.

We claim:

1. A plant sterol-emulsifier complex suitable for incorporation into food products, said plant sterol-emulsifier complex consisting essentially of a mixture of a plant sterol and an emulsifier in a ratio of about two parts plant sterol to about one part emulsifier to a ratio of about one part plant sterol to about two parts emulsifier, and about 0 to about 80 percent of a triglyceride oil, wherein the mixture is co-crystallized to form the plant sterol-emulsifier complex having a melting temperature at least 30° C. lower than the plant sterol alone and wherein the plant sterol-emulsifier complex can be incorporated into food products in an amount effective to reduce serum cholesterol levels in a human consuming the food products without adversely modifying the texture of the food products.

2. The plant sterol-emulsifier complex as defined in claim 1, wherein the mixture contains about 67 to about 33 percent of the plant sterol and about 33 to about 67 percent of the emulsifier with no added triglyceride oil.

3. The plant sterol-emulsifier complex as defined in claim 1, wherein the triglyceride oil is present in the mixture at a level of about 1 to about 80 percent.

4. The plant sterol-emulsifier complex as defined in claim 2, wherein the emulsifier is selected from the group consisting of propylene glycol monoester, lactylated monoglycerides, sodium stearoyl lactylate, diacetyl tartaric acid monoesters, acetic acid ester of monoglyceride, monoglyceride, and mixtures thereof.

5. The plant sterol-emulsifier complex as defined in claim 3, wherein the emulsifier is selected from the group consisting of propylene glycol monoester, lactylated monoglycerides, sodium stearoyl lactylate, diacetyl tartaric acid monoesters, acetic acid ester of monoglyceride, monoglyceride, and mixtures thereof.

6. The plant sterol-emulsifier complex as defined in claim 4, wherein the plant sterol-emulsifier complex has a melting temperature of about 60° C. to about 100° C.

7. The plant sterol-emulsifier complex as defined in claim 5, wherein the plant sterol-emulsifier complex has a melting temperature of about 20° C. to about 100° C.

8. The plant sterol-emulsifier complex as defined in claim 3, wherein the triglyceride oil is selected from the group consisting of soybean oil, vegetable oil, olive oil, corn oil, canola oil, sunflower seed oil, peanut oil, sucrose fatty acid polyesters, and mixtures thereof.

9. The plant sterol-emulsifier complex as defined in claim 1, wherein the plant sterol is a sterol.

10. The plant sterol-emulsifier complex as defined in claim 1, wherein the plant sterol is a stanol.

11. A method of forming a plant sterol-emulsifier complex suitable for use in food products, said method comprising:
(1) forming a mixture of a plant sterol and an emulsifier in the ratio of about two parts plant sterol to about one part emulsifier to a ratio of about one part plant sterol to about two parts emulsifier and about 0 to about 80 percent of a triglyceride oil;
(2) co-melting the mixture; and
(3) cooling the co-melted mixture with stirring to co-crystallize the plant sterol and the emulsifier to form the plant sterol-emulsifier complex, wherein the plant sterol-emulsifier complex has a melting temperature at least 30° C. lower than the plant sterol alone and wherein the plant sterol-emulsifier complex can be incorporated into food products in an amount effective to reduce serum cholesterol levels in a human consuming such food products without adversely modifying the texture of the food product.

12. The method as defined in claim 11, wherein the mixture contains about 67 to about 33 percent of the plant sterol and about 33 to about 67 percent of the emulsifier with no added triglyceride oil.

13. The method as defined in claim 11, wherein the triglyceride oil is present in the mixture at a level of about 1 to about 80 percent.

14. The method as defined in claim 12, wherein the emulsifier is selected from the group consisting of propylene glycol monoester, lactylated monoglycerides, sodium stearoyl lactylate, diacetyl tartaric acid monoesters, acetic acid ester of monoglyceride, monoglyceride and mixtures thereof.

15. The method as defined in claim 13, wherein the emulsifier is selected from the group consisting of propylene glycol monoester, lactylated monoglycerides, sodium stearoyl lactylate, diacetyl tartaric acid monoesters, acetic acid ester of monoglyceride, monoglyceride and mixtures thereof.

16. The method as defined in claim 14, wherein the plant sterol-emulsifier complex has a melting temperature of about 60 to about 100° C.

17. The method as defined in claim 15, wherein the plant sterol-emulsifier complex has a melting temperature of about 20 to about 100° C.

18. The method as defined in claim 13, wherein the triglyceride oil is selected from the group consisting of soybean oil, vegetable oil, olive oil, corn oil, canola oil, sunflower seed oil, peanut oil, sucrose fatty acid polyesters, and mixtures thereof.

19. The method as defined in claim 11, wherein the plant sterol is a sterol.

20. The method as defined in claim 11, wherein the plant sterol is a stanol.

* * * * *